United States Patent
Liu et al.

(10) Patent No.: US 12,482,826 B2
(45) Date of Patent: Nov. 25, 2025

(54) METAL ELECTRODE AND BATTERY

(71) Applicant: SHENZHEN CAPCHEM TECHNOLOGY CO., LTD., Guangdong (CN)

(72) Inventors: Zhongbo Liu, Guangdong (CN); Xiaohu Ao, Guangdong (CN); Yonghong Deng, Guangdong (CN); Yuanyuan Kang, Guangdong (CN); Yunxian Qian, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 538 days.

(21) Appl. No.: 17/920,822

(22) PCT Filed: Apr. 23, 2021

(86) PCT No.: PCT/CN2021/089304
§ 371 (c)(1),
(2) Date: Oct. 24, 2022

(87) PCT Pub. No.: WO2021/227832
PCT Pub. Date: Nov. 18, 2021

(65) Prior Publication Data
US 2023/0163308 A1    May 25, 2023

(30) Foreign Application Priority Data

May 9, 2020    (CN) .......................... 202010388689.5

(51) Int. Cl.
| H01M 4/62 | (2006.01) |
| H01M 4/02 | (2006.01) |
| H01M 4/36 | (2006.01) |
| H01M 4/38 | (2006.01) |
| H01M 4/40 | (2006.01) |

(52) U.S. Cl.
CPC ........... *H01M 4/628* (2013.01); *H01M 4/366* (2013.01); *H01M 4/381* (2013.01); *H01M 4/382* (2013.01); *H01M 4/387* (2013.01); *H01M 4/405* (2013.01); *H01M 2004/021* (2013.01); *H01M 2004/027* (2013.01)

(58) Field of Classification Search
CPC ...... H01M 4/628; H01M 4/366; H01M 4/381; H01M 4/382; H01M 4/387; H01M 4/405; H01M 2004/021; H01M 2004/027; H01M 4/13; H01M 4/36; H01M 4/386; H01M 4/1395; H01M 4/622; H01M 4/134; H01M 4/38; H01M 4/62; H01M 4/624; H01M 10/052; H01M 10/0565; Y02E 60/10
See application file for complete search history.

(56) References Cited

U.S. PATENT DOCUMENTS

| 2016/0336618 A1 | 11/2016 | Lee et al. |
| 2016/0351956 A1 | 12/2016 | Lee et al. |
| 2017/0062829 A1* | 3/2017 | Ryu ............... H01M 10/0569 |
| 2017/0309917 A1* | 10/2017 | Lee ....................... H01M 4/366 |

FOREIGN PATENT DOCUMENTS

| CN | 1612377 A | 5/2005 |
| CN | 103026542 A | 4/2013 |
| CN | 106486699 A | 3/2017 |
| CN | 107305950 A | 10/2017 |
| CN | 107534128 A | 1/2018 |
| CN | 108232289 A | 6/2018 |
| CN | 108807851 A | 11/2018 |
| CN | 109037594 A | 12/2018 |
| CN | 109792043 A | 5/2019 |
| CN | 110808358 A | 2/2020 |
| WO | 2019149939 A1 | 8/2019 |
| WO | 2019236898 A1 | 12/2019 |

OTHER PUBLICATIONS

International Search Report of PCT Patent Application No. PCT/CN2021/089304 issued on Jul. 2, 2021.
Zhongfan Liu, Efficient and Stable Metal Lithium Anode Protective Layer based on PDMS, Wuli Huaxue Xuebao, Acta Phys.-Chim. Sin., Dec. 2016, vol. 32, No. 12, p. 2821.
Shicheng Yu et al., Influence of Microstructure and ALPO4 Secondary-phase on the Ionic Conductivity of Li1.3Al0.3Ti1.7(PO4)3 Solid-state Electrolyte, Functional Materials Letters, Sep. 21, 2016, pp. 1650066-1 to 1650066-6, vol. 9, No. 5.

* cited by examiner

*Primary Examiner* — Daniel S Gatewood

(57) ABSTRACT

In order to overcome the problem of metal dendrites caused by uneven deposition on the surface of the existing metal electrode, the present application provides a metal electrode, comprising a metal layer and a coating, the coating comprises at least one block copolymer; the block copolymer comprises a first polymer block for independently conducting metal ions and a second polymer block for providing mechanical strength; a shear modulus of the coating is $\geq 10^7$ Pa, and a thickness of the coating is 500 nm-50 μm. Meanwhile, the application also discloses a battery comprising the metal electrode. The metal electrode provided by the application has good ionic conductivity and inhibition capability for metal dendrite.

13 Claims, No Drawings

METAL ELECTRODE AND BATTERY

TECHNICAL FIELD

The present application belongs to the technical field of electrochemical batteries, and particularly relates to a metal electrode and a battery.

BACKGROUND

The idea of using metal as the negative electrode of battery has experienced a long period of development since it was put forward. As a negative electrode, metal has an advantage in energy density. Taking lithium metal as an example, lithium has low potential (−3.04V vs standard hydrogen electrode) and high theoretical specific capacity (3860 mAh/g), which can endow the battery with high energy density. Therefore, lithium metal is used as a negative electrode in early studies of lithium secondary batteries. However, due to the consideration of the safety performance of such batteries, embedded negative electrode materials such as graphite are gradually emerging, and the research of lithium metal negative electrode has been in a sluggish stage for a long time. With the increasing demand for energy density of rechargeable batteries, electrochemical batteries with high energy density metal negative electrode have great potential, and the research on metal negative electrode has become a hot spot again.

Metal negative electrode has many advantages, but it has not been widely used at present, mainly because there are some limitations in using metal as battery negative electrode. Take lithium battery as an example. In the process of charging and discharging, the battery works through reversible intercalation/deintercalation of internal lithium ions between positive and negative electrodes. At the interface between lithium metal negative electrode and electrolyte, due to the contact problem of interface or the existence of defective sites, the current density of some sites is high, and the deposition rate of lithium ions at these sites is accelerated, which leads to the uneven deposition of lithium, namely dendrite, resulting in dead lithium. Or the further developed lithium dendrite pierces the electrolyte or membrane, which eventually leads to the performance attenuation or failure of lithium batteries. Similar problems also occur in electrochemical batteries using other metals or their alloys as negative electrodes.

ACTA PHYSICO-CHIMICA SINICA (2016, 32 (12), 2821-2821) records a technology of using porous polydimethylsiloxane (PDMS) as metal lithium protection, which adopts its high modulus to inhibit lithium dendrite, but it does not have lithium conductivity. Therefore, this PDMS protection layer has the risk of increasing the interface impedance between lithium negative electrode and electrolyte.

Patent (CN109792043A) discloses a metal component, the coating of which is a fluoropolymer with $-SO_3Y$ functional group. LiF is generated by the reaction between fluoropolymer and lithium metal to improve the stability of the component, but the fluoropolymer has higher cost and lower ionic conductivity (less than $6 \times 10^{-6}$ S/cm at 80° C.), and this addition would increase the impedance of the battery and affect the performance.

Patent (CN103026542A) discloses a technology of using block polymer as solid electrolyte. In the disclosed technology, the block polymer is mainly used as electrolyte between positive and negative electrodes, which not only inhibits lithium dendrite, but also has the function of separating the positive and negative electrodes. It is difficult to closely adhere to the electrode and inhibit the generation of metal dendrite. It merely inhibits the continuous growth, and the battery prepared this way has high internal resistance.

SUMMARY

Aiming at the problem of metal dendrites caused by uneven deposition on the surface of the existing metal electrode, the present application provides a metal electrode and a battery.

The technical solutions adopted by the application to solve the technical problems are as follows.

In one aspect, the present application provides a metal electrode, comprising a metal layer and a coating, the coating comprises at least one block copolymer;
  the block copolymer comprises a first polymer block for independently conducting metal ions and a second polymer block for providing mechanical strength;
  a shear modulus of the coating is $\geq 10^7$ Pa, and a thickness of the coating is 500 nm-50 µm.

Optionally, the first polymer block comprises at least one repeating unit containing an oxygen group.

Optionally, the first polymer block comprises one or more of at least one repeating unit containing an ether group and at least one repeating unit containing an ester group.

Optionally, the first polymer block comprises one or more of polyoxyethylene and polycaprolactone.

Optionally, the second polymer block comprises one or more of at least one repeating unit containing an aryl vinyl group and at least one repeating unit containing an acrylate group.

Optionally, the second polymer block comprises one or more of polystyrene and polymethacrylate.

Optionally, a weight ratio of the first polymer block to the second polymer block in the block copolymer is 30-70:30-70.

Optionally, the metal layer comprises a first metal and an optional second metal, the first metal comprises one or more of lithium, sodium, potassium, magnesium and zinc, and the second metal comprises one or more of silicon, tin and germanium.

Optionally, the coating further comprises one or more metal salts.

In another aspect, the present application also provides a battery, comprising the metal electrode described above.

According to the metal electrode of the present application, the coating is provided on the metal layer, and the block copolymer in the coating includes a first polymer block for independently conducting metal ions. The first polymer block endows the coating with good ion conductivity, which reduces the increase in impedance brought by the coating. The coating can provide a uniform ion transmission channel at the interface between the negative electrode and electrolyte, and the intercalation/deintercalation of metal ions would be induced to tend to be uniform, which reduces the possibility of metal dendrites from the source. Compared with the direct use of metal negative electrode, the coating can increase uniformity and stability of the interface between the negative electrode and electrolyte. The second polymer block endows the coating with a shear modulus of $\geq 10^7$ Pa. Because the coating is closely attached to the metal layer, the coating with high shear modulus can exert resistance on the growth of metal dendrites, effectively inhibiting the generation of metal dendrites on the surface of the metal layer.

When the coating is used as a protective layer for the surface of the metal negative electrode, with the adoption of the preparation method of coating directly on the surface of the metal negative electrode, the coating penetrates into the surface of the metal negative electrode so as to fuse with the metal negative electrode on the micro-nano scale, thus forming a micro and uniform interface, which is helpful to construct a low-impedance interface layer between the metal negative electrode and solid electrolyte. Moreover, the coating thickness is controlled between 500 nm-50 μm, which would not increase the internal electrolyte bulk impedance of the battery; and the coating can improve the battery capacity by reducing the interface impedance of the battery. While the direct use of block polymer as a solid electrolyte would greatly increase the battery impedance, increase the internal polarization of the battery and thus deteriorate the cycle performance of the battery. Therefore, the battery using the above metal electrode has advantages in improving discharge capacity and cycle performance stability.

DETAILED DESCRIPTION OF DISCLOSED EMBODIMENTS

In order to make the technical solutions, beneficial effects and technical problems solved by the present application more clear, the application will be further illustrated in detail with embodiments below. It should be understood that the specific embodiments described here are only for explaining the application, not for limiting the application.

An embodiment of the present application provides a metal electrode, comprising a metal layer and a coating, the coating comprises at least one block copolymer;
the block copolymer comprises a first polymer block for independently conducting metal ions and a second polymer block for providing mechanical strength
a shear modulus of the coating is $\geq 10^7$ Pa, and a thickness of the coating is 500 nm-50 μm.

The first polymer block endows the coating with good ion conductivity, which reduces the increase in impedance brought by the coating. The coating can provide a uniform ion transmission channel at the interface between the negative electrode and electrolyte, and the intercalation/deintercalation of metal ions would be induced to tend to be uniform, which reduces the possibility of metal dendrites from the source. Compared with the direct use of metal negative electrode, the coating can increase uniformity and stability of the interface between the negative electrode and electrolyte. The second polymer block endows the coating with a shear modulus of $\geq 10^7$ Pa. Because the coating is closely attached to the metal layer, the coating with high shear modulus can exert resistance on the growth of metal dendrites, effectively inhibiting the generation of metal dendrites on the surface of the metal layer.

When the coating is used as a protective layer for the surface of the metal negative electrode, with the adoption of the preparation method of coating directly on the surface of the metal negative electrode, the coating penetrates into the surface of the metal negative electrode so as to fuse with the metal negative electrode on the micro-nano scale, thus forming a micro and uniform interface, which is helpful to construct a low-impedance interface layer between the metal negative electrode and solid electrolyte. Moreover, the coating thickness is controlled between 500 nm-50 μm, which would not increase the internal electrolyte bulk impedance of the battery; and the coating can improve the battery capacity by reducing the interface impedance of the battery. While the direct use of block polymer as a solid electrolyte would greatly increase the battery impedance, increase the internal polarization of the battery and thus deteriorate the cycle performance of the battery. Therefore, the battery using the above metal electrode has advantages in improving discharge capacity and cycle performance stability.

If the thickness of the coating is too small, it is difficult to inhibit metal dendrites; if the thickness of the coating is too large, the overall internal resistance of the battery would be too large, which is not conducive to the battery capacity.

In some preferred embodiments, the thickness of the coating is 600 nm-42 μm.

In a more preferred embodiment, the thickness of the coating is 5 μm-18 μm.

In some embodiments, the first polymer block includes at least one repeating unit containing an oxygen group.

The oxygen-containing group is selected from oxygen-containing groups capable of conducting metal ions, for example, the oxygen-containing group is selected from an ether group or ester group.

In a preferred embodiment, the first polymer block comprises one or more of at least one repeating unit containing an ether group and at least one repeating unit containing an ester group.

The repeating unit containing an ether group may be selected from a polyether group, especially high-polymerized or low-polymerized repeating unit containing oxyethylene.

The repeating unit containing an ester group may be selected from a repeating unit containing a carboxylate group or a repeating unit containing a carbonate group.

In some embodiments, the first polymer block comprises one or more of polyoxyethylene and polycaprolactone.

In some embodiments, the second polymer block comprises one or more of at least one repeating unit containing an aryl vinyl group and at least one repeating unit containing an acrylate group.

The repeating unit containing an aryl vinyl group particularly refers to the repeating unit obtained by polymerization of aryl vinyl and/or aryl vinyl derivative, and the aryl vinyl derivative is obtained form mono-functional or multi-functional substitution of aryl vinyl.

The repeating unit containing an acrylate group particularly refer to the repeating unit obtained by polymerization of acrylate and/or acrylate derivative, and the acrylate derivative is obtained form mono-functional or multi-functional substitution of acrylate.

The repeating unit containing an aryl vinyl group and the repeating unit containing an acrylate group form a mechanically stable rigid chain segment, which can effectively improve the mechanical properties of the coating.

In some embodiments, the second polymer block comprises one or more of polystyrene and polymethacrylate.

It should be noted that, in some embodiments, on the premise of ensuring its mechanical strength, the second polymer block may also be selected from polymers with certain lithium ion conductivity. For example, when the second polymer block is selected from polymethacrylate, it also has weak lithium ion conductivity.

In some embodiments, in the block copolymer, a weight ratio of the first polymer block to the second polymer block is 30-70:30-70.

In a preferred embodiment, the weight ratio of the first polymer block to the second polymer block is 40-60:40-60.

If the addition amount of the first polymer block is too small, and correspondingly, the addition amount of the second polymer block is too large, the ionic conductivity of the coating would be insufficient and the internal resistance of the battery would increase. If the addition amount of the first polymer block is too large, and correspondingly, the addition amount of the second polymer block is too small, the mechanical strength of the coating would be insufficient, and the inhibition effect of metal dendrites on the surface of the metal layer would be reduced.

In some embodiments, the metal layer comprises a first metal and an optional second metal, the first metal comprises one or more of lithium, sodium, potassium, magnesium and zinc, and the second metal comprises one or more of silicon, tin and germanium.

In a specific embodiment, the metal layer only includes a first metal, and the first metal is a simple substance or an alloy selected from the group consisting of lithium, sodium, potassium, magnesium and zinc. In other embodiments, the metal layer further includes a second metal, and the first metal and second metal are mixed in the form of an alloy.

In some embodiments, the coating further comprises one or more metal salts.

In a preferred embodiment, the metal element in the metal salt is selected from the same metal element as the metal layer, and the metal salt plays a complementary role of metal ions in the coating to avoid the consumption of the metal layer during the first charge and discharge.

When the metal layer is lithium or lithium alloy, the metal salt includes one or more of LiBr, LiI, $LiClO_4$, $LiBF_4$, $LiPF_6$, LiSCN, $LiB_{10}Cl_{10}$, $LiCF_3SO_3$, $LiCF_3CO_2$, $LiBF_2C_2O_4$, $LiB(C_2O_4)_2$, $LiN(SO_2CF_3)_2$, $LiN(SO_2F)_2$, $LiN(SO_2F)(SO_2CF_3)$, $LiC(SO_2CF_3)_3$, $LiPF_2(C_2O_4)$ and etc.

Another embodiment of the present application provides a battery, comprising the metal electrode described above.

Compared with the existing battery, by using the above metal electrode, the battery has the advantages of low internal resistance and high cycle stability, and the metal electrode can greatly improve the cycle life of the stable charge and discharge of the battery, improve the discharge capacity of the battery and reduce the probability of short-circuit and failure of the battery.

In some embodiments, the metal electrode is used as negative electrode of the battery, the battery further comprises a positive electrode and an electrolyte, and the electrolyte comprises one or more of liquid electrolyte, solid electrolyte or gel electrolyte.

When the electrolyte is selected from solid electrolyte or gel electrolyte, the electrolyte is placed between the positive electrode and the metal electrode.

When the electrolyte is selected from liquid electrolyte, the positive electrode and the metal electrode are soaked in the electrolyte.

In some embodiments, the battery further includes a separator between the positive electrode and the metal electrode.

In some embodiments, the battery is a lithium metal battery or a primary lithium metal battery, and the metal layer in the metal electrode is lithium or lithium alloy.

In some embodiments, the battery is a lithium-metal battery or a lithium-sulfur battery.

The present application is further illustrated with the following embodiments. It should be understood that the present application is not limited to the following embodiments, and the methods are considered as conventional methods unless otherwise specified. Materials may be obtained from the market unless otherwise specified.

Embodiment 1

The embodiment is used to explain the battery and preparation method thereof disclosed by the present application, including the following steps.

(1) Preparation of Metal Electrode 2 g of block copolymer of polyoxyethylene and polystyrene (PEO-PS) (weight-average molecular weight: 30 W, mass ratio of PEO to PS: 50/50) and 0.6 g of $LiN(SO_2CF_3)_2$ were dissolved in 4 g of tetrahydrofuran to form a solution. The solution was coated on the surface of lithium metal plate, vacuum dried at room temperature for 2 h, and then vacuum dried at 60° C. for 12 h. A lithium metal electrode with coating protection was obtained as a negative electrode, and the thickness of the coating was 5 μm.

(2) Preparation of Battery

Preparation of electrolyte: A solid electrolyte based on polyoxyethylene (PEO) was used, and 2.0 g of PEO (weight-average molecular weight: 100 W) and 0.9 g of $LiN(SO_2CF_3)_2$ were dissolved in 5 g of acetonitrile to obtain a solution. The obtained solution was put in a coating machine, coated automatically with a spatula, vacuum dried at room temperature for 8 h, and then vacuum dried at 80° C. for 12 h to obtain 40 μm of electrolyte.

Preparation of $LiFePO_4$ positive electrode: active material $LiFePO_4$, conductive carbon black and the above polymer electrolyte were mixed according to the mass ratio of 80:10:10, cyclohexanone was added, and stirred until the mixture was uniform. The above obtained slurry was evenly coated on a carbon-coated aluminum foil, dried at 80° C. until there was no obvious liquid, and then dried in vacuum at 100° C. for 12 hours. A positive electrode was obtained.

Preparation of lithium battery: a button battery was assembled according to the sequence of negative electrode shell-gasket-negative electrode-electrolyte-positive electrode-positive electrode shell.

Embodiment 2

The embodiment is used to explain the battery and preparation method thereof disclosed by the present application, including most steps of Embodiment 1, with the following differences.

The PEO-based electrolyte of Embodiment 1 was replaced by a solid electrolyte based on $Li_{1.3}Al_{0.3}Ti_{1.7}(PO_4)_3$ (LATP), and the preparation method of the solid electrolyte $Li_{1.3}Al_{0.3}Ti_{1.7}(PO_4)_3$ (LATP) is shown in the literature (Funct. Mater. Lett., 2016, 09, 1650066.). The rest of the steps were the same as Embodiment 1.

Embodiment 3

The embodiment is used to explain the battery and preparation method thereof disclosed by the present application, including most steps of Embodiment 1, with the following differences.

The PEO-PS in Embodiment 1 was replaced by the block copolymer of polycaprolactone and polymethacrylate (PCL-PMMA) (weight-average molecular weight: 50 W, mass ratio of PCL to PMMA: 60/40). The rest of the steps were the same as Embodiment 1.

Embodiment 4

The embodiment is used to explain the battery and preparation method thereof disclosed by the present application, including most steps of Embodiment 1, with the following differences.

The lithium metal negative electrode of Embodiment 1 was replaced with a lithium tin alloy (Li—Sn) negative electrode. The rest of the steps were the same as Embodiment 1.

Embodiment 5

The embodiment is used to explain the battery and preparation method thereof disclosed by the present application, including most steps of Embodiment 1, with the following differences.

The coating thickness of the coating on the lithium metal negative electrode with coating protection was 600 nm.

Embodiment 6

The embodiment is used to explain the battery and preparation method thereof disclosed by the present application, including most steps of Embodiment 1, with the following differences.

The coating thickness of the coating on the lithium metal negative electrode with coating protection was 18 μm.

Embodiment 7

The embodiment is used to explain the battery and preparation method thereof disclosed by the present application, including most steps of Embodiment 1, with the following differences.

The coating thickness of the coating on the lithium metal negative electrode with coating protection was 42 μm.

Embodiment 8

The embodiment is used to explain the battery and preparation method thereof disclosed by the present application, including the following steps.

(1) Preparation of Metal Electrode Protected By Composition 3 g of polyoxyethylene and polystyrene (PEO-PS) (weight-average molecular weight: 30 W, mass ratio of PEO to PS: 50/50) and 0.6 g of 0.6 g $NaN(SO_2F)_2$ were dissolved in 4 g of tetrahydrofuran to obtain a solution. The solution is coated on the surface of sodium metal electrode plate, vacuum dried at room temperature for 2 h, and then vacuum dried at 60° C. for 12 h. A sodium metal electrode with coating protection was obtained as a negative electrode, and the thickness of the coating was 5 μm.

(2) Preparation of Battery

Preparation of electrolyte: a solid electrolyte based on polyoxyethylene (PEO) was used, and 2.0 g of PEO (weight-average molecular weight: 100 W) and 0.9 g of $NaN(SO_2F)_2$ were dissolved in 5 g of acetonitrile to obtain a solution. The obtained solution was put in a coating machine, coated automatically with a spatula, vacuum dried at room temperature for 8 h, and then vacuum dried at 80° C. for 12 h to obtain 40 μm electrolyte.

Preparation of sodium ferric phosphate ($NaFePO_4$) positive electrode: active material $NaFePO_4$, conductive carbon black, and the above polymer electrolyte were mixed according to the mass ratio of 80:10:10, cyclohexanone was added, and stirred until the mixture was uniform. The above obtained slurry was evenly coated on a carbon-coated aluminum foil, dried at 80° C. until there was no obvious liquid, and then dried in vacuum at 100° C. for 12 hours. A positive electrode was obtained.

Preparation of sodium battery: a button battery was assembled according to the sequence of negative electrode shell-gasket-negative electrode-electrolyte-positive electrode-positive electrode shell.

Comparative Example 1

The embodiment is used to compare and explain the battery and preparation method thereof disclosed by the present application, including most of the steps in Embodiment 1, with the following differences.

An uncoated lithium metal electrode plate was used as negative electrode.

Comparative Example 2

The embodiment is used to compare and explain the battery and preparation method thereof disclosed by the present application, including most of the steps in Embodiment 1, with the following differences.

A lithium-tin alloy (Li—Sn) negative electrode plate with uncoated protection layer was used as negative electrode.

Comparative Example 3

The embodiment is used to compare and explain the battery and preparation method thereof disclosed by the present application, including most of the steps in Embodiment 3, with the following differences.

The block copolymer of polycaproactone and polymethacrylate (PCL-PMMA) in Embodiment 3 was replaced with polycaprolactone (PCL).

Comparative Example 4

The embodiment is used to compare and explain the battery and preparation method thereof disclosed by the present application, including most of the steps in Embodiment 3, with the following differences.

The block copolymer of polycaproactone and polymethacrylate (PCL-PMMA) in Embodiment 3 was replaced with polymethacrylate (PMMA).

Comparative Example 5

The embodiment is used to compare and explain the battery and preparation method thereof disclosed by the present application, including most of the steps in Embodiment 1, with the following differences.

The coating thickness of the coating on the lithium metal negative electrode with coating protection was 400 nm.

Comparative Example 6

The embodiment is used to compare and explain the battery and preparation method thereof disclosed by the present application, including most of the steps in Embodiment 1, with the following differences.

The coating thickness of the coating on the lithium metal negative electrode with coating protection was 70 μm.

Comparative Example 7

The embodiment is used to compare and explain the battery and preparation method thereof disclosed by the present application, including most of the steps in Embodiment 8, with the following differences.

An sodium metal electrode plate without coating protection layer was used as negative electrode.

Performance Tests

The following battery tests were conducted on the batteries prepared by the above Embodiments 1-7 and Comparative examples 1-6.

The tests were conducted with a battery charger/discharger at 60° C. The battery was charged to 3.8 V at 0.2 C current, then discharged to 2.8 V at 0.2 C current, and the charge-discharge cycles were repeated. The charger/discharger automatically recorded the charging and discharging capacity data, and the first discharging capacity was the discharging capacity of the first cycle. According to the formula "capacity retention rate=discharge capacity of the nth cycle/discharge capacity of the first cycle×100%", the capacity retention rate of each cycle of the battery was calculated, and the cycle life was defined as the number of cycles with a discharge capacity retention rate of 80%.

Test of shear modulus of the coating: the preparation process of the coating was as described in the preparation process of the metal electrode in Embodiment 1, with the following differences.

The lithium metal electrode plate was replaced by a polytetrafluoroethylene membrane, and the thickness of the coating was controlled in the range of 200 μm-1 mm. The coating was peeled off from the polytetrafluoroethylene membrane to obtain a self-supporting coating membrane. The coating membrane was cut into a sample of 40 mm×10 mm, and the shear modulus of the coating was tested by a dynamic thermal analyzer.

Test of ion conductivity of the coating: the preparation process of the coating was as described in the preparation of metal electrode in Embodiment 1, with the following differences.

The lithium metal electrode plate was replaced by a polytetrafluoroethylene membrane. The coating was peeled off from the polytetrafluoroethylene membrane to obtain a self-supporting coating membrane. The coating membrane was cut into a wafer with a diameter of 18 mm. A symmetrical button battery was assembled according to the sequence of negative electrode shell-gasket-coating wafer-gasket-positive electrode shell. Electrochemical AC impedance test was conducted with an electrochemical workstation to obtain the ion conductivity of the coating.

Test of impedance of the battery: the preparation process of the coated lithium metal electrode was as described in the preparation of metal electrode in Embodiment 1. Li|Li symmetrical button battery was prepared by assembling negative electrode shell-gasket-lithium metal sheet-coated lithium metal electrode-positive electrode shell in sequence. Electrochemical AC impedance test was conducted with an electrochemical workstation to obtain the impedance of the battery.

The following battery tests were conducted on the batteries prepared by the above Embodiment 8 and Comparative example 7:

The test was conducted with a battery charger/discharger at 60° C. The battery was charged to 3.8 V at 0.2 C current, then discharged to 2.0 V at 0.2 C current, and the charge-discharge cycles were repeated. The charger/discharger automatically recorded the charging and discharging capacity data, and the first discharging capacity was the discharging capacity of the first cycle. According to the formula "capacity retention rate=discharge capacity of the nth cycle/discharge capacity of the first cycle×100%", the capacity retention rate of each cycle of the battery was calculated, and the cycle life was defined as the number of cycles with a discharge capacity retention rate of 80%.

Test of shear modulus of the coating: the preparation process of the coating was as described in the preparation process of the metal electrode in Embodiment 8, with the following differences.

The sodium metal electrode plate was replaced by a polytetrafluoroethylene membrane, and the thickness of the coating was controlled in the range of 200 μm-1 mm. The coating was peeled off from the polytetrafluoroethylene membrane to obtain a self-supporting coating membrane. The coating membrane was cut into a sample of 40 mm×10 mm, and the shear modulus of the coating was tested by a dynamic thermal analyzer.

Test of ion conductivity of the coating: the preparation process of the coating was as described in the preparation of metal electrode in Embodiment 8, with the following differences.

The sodium metal electrode plate was replaced by a polytetrafluoroethylene membrane. The coating was peeled off from the polytetrafluoroethylene membrane to obtain a self-supporting coating membrane. The coating membrane was cut into a wafer with a diameter of 18 mm. A symmetrical button battery was assembled according to the sequence of negative electrode shell-gasket-coating wafer-gasket-positive electrode shell. Electrochemical AC impedance test was conducted with an electrochemical workstation to obtain the ion conductivity of the coating.

Test of impedance of the battery: the preparation process of the coated sodium metal electrode was as described in the preparation of metal electrode in Embodiment 8. Na|Na symmetrical button battery was prepared by assembling negative electrode shell-gasket-sodium metal sheet-coated sodium metal electrode-positive electrode shell in sequence. Electrochemical AC impedance test was conducted with an electrochemical workstation to obtain the impedance of the battery.

The test results are shown in Table 1.

TABLE 1

Battery performance, coating performance and symmetrical battery impedance performance of different Embodiments/Comparative examples

| Embodiment/Comparative example | Battery charging and discharging performance | | Coating performance | | Impedance of symmetric battery/Ω |
|---|---|---|---|---|---|
| | Cycle life/times | First discharge capacity/ mAh $g^{-1}$ | Shear modulus/×$10^7$ Pa | Ion conductivity/×$10^{-5}$ S $cm^{-1}$ | |
| Embodiment 1 | 250 | 136 | 3.5 | 5.5 | 40 |
| Embodiment 2 | 260 | 139 | 3.5 | 5.5 | 40 |
| Embodiment 3 | 280 | 124 | 5.7 | 1.3 | 175 |
| Embodiment 4 | 252 | 134 | 3.5 | 5.3 | 42 |
| Embodiment 5 | 235 | 140 | 2.5 | 5.5 | 12 |
| Embodiment 6 | 275 | 130 | 4.1 | 5.5 | 146 |
| Embodiment 7 | 290 | 118 | 4.6 | 5.5 | 360 |
| Embodiment 8 | 220 | 121 | 3.2 | 4.6 | 50 |
| Comparative example 1 | 110 | 111 | — | — | — |

TABLE 1-continued

Battery performance, coating performance and symmetrical battery impedance performance of different Embodiments/Comparative examples

| Embodiment/ Comparative example | Battery charging and discharging performance | | Coating performance | | Impedance of symmetric battery/Ω |
|---|---|---|---|---|---|
| | Cycle life/times | First discharge capacity/ mAh g$^{-1}$ | Shear modulus/×10$^7$ Pa | Ion conductivity/×10$^{-5}$ S cm$^{-1}$ | |
| Comparative example 2 | 103 | 106 | — | — | — |
| Comparative example 3 | 150 | 138 | 0.6 | 6.4 | 32 |
| Comparative example 4 | 310 | 61 | 8.7 | 0.05 | 4500 |
| Comparative example 5 | 190 | 143 | 1.9 | 5.5 | 9 |
| Comparative example 6 | 320 | 99 | 5.3 | 5.5 | 570 |
| Comparative example 7 | 105 | 93 | — | — | — |

Comparing Embodiment 1 and Comparative example 1 in Table 1, it can be seen that with lithium metal negative electrode protected by the coating, the lithium battery had higher first discharge capacity and longer cycle life with capacity retention rate of not less than 80%. Embodiment 1 adopted a metal negative electrode with a block polymer protection layer, which was conducive to building an interface layer with low impedance between the metal negative electrode and solid electrolyte, reducing the overall impedance of the battery, thus improving the charging and discharging capacity of the battery. With the increase of battery charging and discharging cycles, the metal dendrites and electrode/electrolyte interface instability would lead to capacity attenuation. The metal negative electrode of Embodiment 1 contained a coating, which could inhibit the formation of metal dendrites during charging and discharging, reduce the capacity attenuation caused by the dead lithium on interface and the loss of active lithium, improve the stability of battery charging and discharging, and thus prolong the cycle life of battery charging and discharging. Therefore, the battery of Embodiment 1 has better first discharge capacity and longer cycle life than that of Comparative example 1.

In fact, by comparing Embodiment 1, Embodiment 2, Embodiment 3, Embodiment 4 and Comparative examples 1-2, it can be seen that, for the battery system with the same positive and negative electrode active materials, when different protective coatings, different electrolytes, different metal or alloy negative electrodes were used, the lithium battery with coating protective negative electrodes all showed better first discharge capacity and cycle life, which indicated that this method had a wide application range.

Comparing Embodiment 1, Embodiment 5, Embodiment 6, Embodiment 7 and Comparative examples 5-6, it can be seen that the thickness of the coating also played a decisive role in the protection of lithium metal negative electrode. When the thickness of the coating was too small, it was difficult to inhibit the lithium dendrites, and the cycle life was not obviously improved. When the thickness of the coating was too large, the interface impedance increased thus the overall impedance of the battery would increase, resulting in the decrease of the first discharge capacity.

Comparing Embodiment 3 and Comparative examples 3-4, it can be seen that both the first polymer block and second polymer block of the block copolymer in the coating were necessary to ensure the cycle performance of the battery. The reason was that the first polymer block and second polymer block enhanced the metal electrode in ionic conductivity and mechanical strength, respectively, and thus had a synergistic effect on the overall performance of the battery.

Comparing Embodiment 8 and Comparative example 7, it can be seen that in sodium battery system, the sodium battery with sodium metal negative electrode protected by coating had higher first discharge capacity and longer cycle life. Therefore, the metal electrode structure provided by the present application has certain universality on different metal electrodes.

The above are only preferred embodiments of the present application, and not intended to limit the present application. Any modifications, equivalent substitutions and improvements made within the spirit and principle of the present application shall be included in the scope of protection of the present application. Further, the singular terms "a", "an" and "the" include plural reference and vice versa unless the context clearly indicates otherwise.

The invention claimed is:

1. A metal electrode, comprising a metal layer and a coating, wherein the coating comprises at least one block copolymer;
    the block copolymer comprises a first polymer block for independently conducting metal ions and a second polymer block for providing mechanical strength;
    a shear modulus of the coating is $\geq 10^7$ Pa, and a thickness of the coating is 500 nm-50 µm; and
    wherein the first polymer block comprises polycaprolactone; and the second polymer block comprises one or more of at least one repeating unit containing an aryl vinyl group and at least one repeating unit containing an acrylate group.

2. The metal electrode of claim 1, wherein the second polymer block comprises one or more of polystyrene and polymethacrylate.

3. The metal electrode of claim 1, wherein a weight ratio of the first polymer block to the second polymer block in the block copolymer is 30-70:30-70.

4. The metal electrode of claim 1, wherein the metal layer comprises a first metal and an optional second metal, the first metal comprises one or more of lithium, sodium, potassium, magnesium and zinc, and the second metal comprises one or more of silicon, tin and germanium.

5. The metal electrode of claim 1, wherein the coating further comprises one or more metal salts.

6. A battery, comprising the metal electrode of claim 1.

7. The metal electrode of claim 1, wherein a weight ratio of the first polymer block to the second polymer block in the block copolymer is 40-60:40-60.

8. The metal electrode of claim 1, wherein the thickness of the coating is 600 nm-42 µm.

9. The metal electrode of claim 1, wherein the thickness of the coating is 5 µm-18 µm.

10. The metal electrode of claim 5, wherein when the metal layer is lithium or lithium alloy, the metal salt comprises one or more of $LiBr$, $LiI$, $LiClO_4$, $LiBF_4$, $LiPF_6$, $LiSCN$, $LiB_{10}Cl_{10}$, $LiCF_3SO_3$, $LiCF_3CO_2$, $LiBF_2C_2O_4$, $LiB(C_2O_4)_2$, $LiN(SO_2CF_3)_2$, $LiN(SO_2F)_2$, $LiN(SO_2F)(SO_2CF_3)$, $LiC(SO_2CF_3)_3$, and $LiPF_2(C_2O_4)$.

11. The battery of claim 6, wherein the metal electrode is used as negative electrode of the battery, the battery further comprises a positive electrode and an electrolyte, and the electrolyte comprises one or more of liquid electrolyte, solid electrolyte or gel electrolyte.

12. The battery of claim 6, wherein the battery is a lithium metal battery or a primary lithium metal battery, and the metal layer in the metal electrode is lithium or lithium alloy.

13. The battery of claim 6, wherein the battery is a lithium-metal battery or a lithium-sulfur battery.

* * * * *